Dec. 10, 1929.  T. M. EYNON  1,739,297
DASHBOARD LIQUID LEVEL INDICATOR
Filed March 31, 1921   2 Sheets-Sheet 1
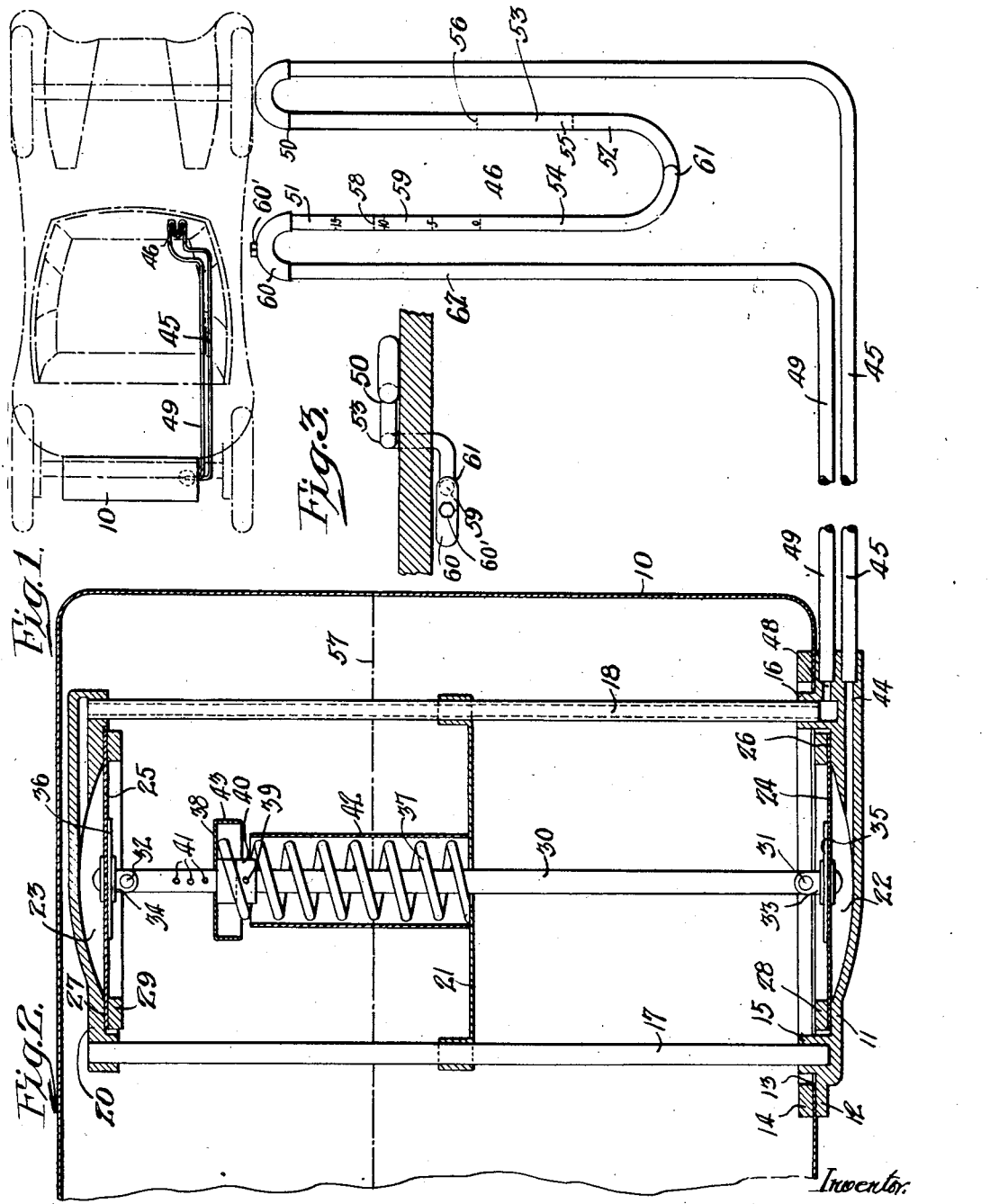

Dec. 10, 1929. T. M. EYNON 1,739,297
DASHBOARD LIQUID LEVEL INDICATOR
Filed March 31, 1921   2 Sheets-Sheet 2
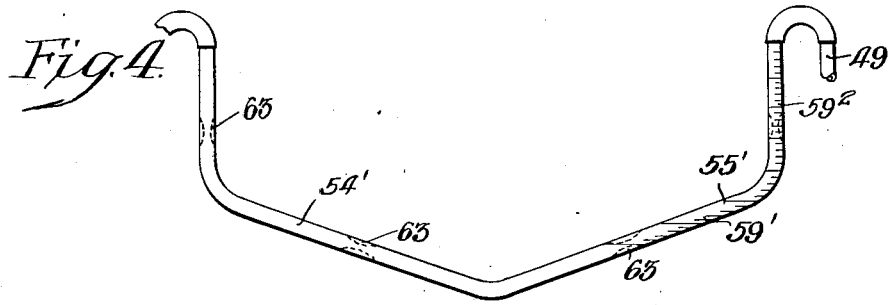
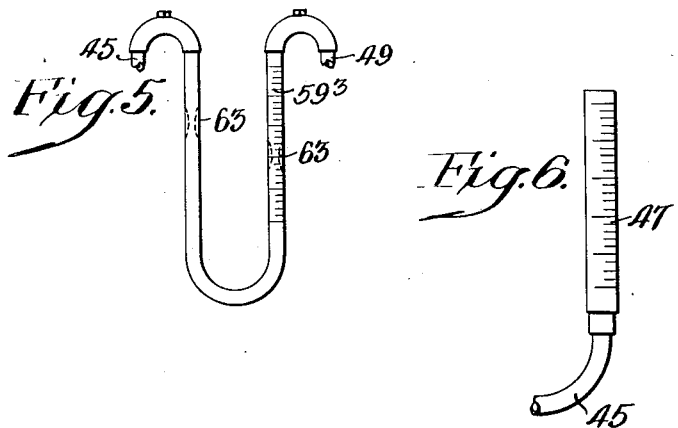
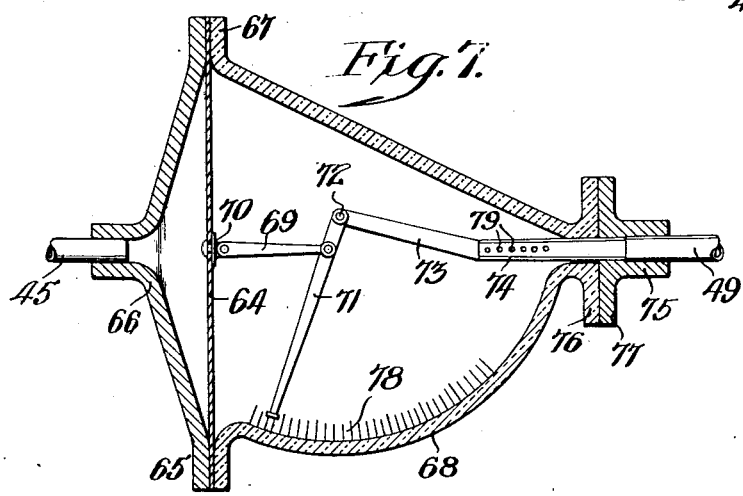
Witness:
Walter Chim
Inventor:
Thomas M. Eynon
By
Attorney Patented Dec. 10, 1929

1,739,297

UNITED STATES PATENT OFFICE

THOMAS M. EYNON, OF PHILADELPHIA, PENNSYLVANIA

DASHBOARD LIQUID-LEVEL INDICATOR

Application filed March 31, 1921. Serial No. 457,278.

My invention relates to indicators for observation at or near the dash to show the height of gasoline in automobile tanks.

The main purpose of my invention is to provide for indication by fluid means through a diaphragm operated directly by the pressure of the gasoline.

A further purpose is to place a pair of diaphragms in balance except as to the pressure due to the weight of the gasoline, preferably counter-balancing the weight of the system, and to transmit diaphragm movement into indication at the dashboard, most desirably by a fluid means.

A further purpose is to provide two connected diaphragms, one in the bottom of the tank, and enclosed at one side of each to cut these spaces off from communication from the tank, to counter-balance the weight of the parts and to fill one of the compartments at least and the indicator and connections with liquid to give indication of the diaphragm position.

A further purpose is to provide a pair of balanced diaphragms, one subject to the weight of the liquid in the tank and both having compartments on one side cut off from communication with the tank, and to form fluid communications from two compartments to an indicator in which the release of pressure in one compartment and the coincident increase of pressure in the other will both assist in the indication.

I have preferred to illustrate my invention by but one main form, with variations in the indicator, among the many forms by which it might be carried out, selecting a form which is practical, efficient and quite inexpensive and which at the same time well illustrates the principles of the invention.

Figure 1 is a top plan view of an automobile to which my invention is applied, the automobile itself being in outline.

Figure 2 is a vertical section through the tank seen in Figure 1, with an elevation of an indicator which may be used.

Fig. 3 is a fragmentary section through the dash-board showing the indicator in position.

Figures 4, 5 and 6 are front elevations of modified forms of the indicator.

Figure 7 is a longitudinal section of still another form of indicator.

In the drawings similar numerals indicate like parts.

The tank 10 is intended to represent any automobile tank within which it is desired to place indicating mechanism. There is no limitation of tank level, as all of my forms will operate with tanks above or below the level of the dash. However, I recognize that a part of my invention can be used with indicators which are unsuited to operate below the level of the tank.

For convenience in placing the operating mechanism construction within old as well as new tanks, I have mounted it upon an insertable base 11, flanged at 12 to engage the edge 13 of an opening in the bottom of the tank. I have reinforced the edge by a ring 14 inside the tank, which reinforcement and flange 12 may receive bolts holding the parts together or may be brazed or otherwise secured to the edge.

For convenience in manufacture I form sockets 15, 16 within the base to receive standards 17, 18 by which the head 20 is supported at the upper end and upon which an intermediate bracket 21 is mounted at any convenient point. The bracket may be fastened to the rods by so many different means that no specific means has been pointed out.

The base 11 and the head 20 are recessed at 22 and 23 to cooperate with diaphragms 24, 25, resting upon seats 26, 27 about the recesses, so as to form pockets or compartments for fluid located upon one side of each diaphragm. The diaphragms are held in place by rings 28 and 29 with suitable packing where required. With some forms of diaphragms, particularly with surfaced sheep skin diaphragms, packing will not ordinarily be required. The rings are held in place by bolts not shown.

The two diaphragms are connected by a rod or strip 30, which is shown as secured at 31, 32 to ears 33, 34 upon the diaphragms, so that both of these diaphragms will move in unison. Where soft diaphragms are used, some stiffening of the central part of the body of the diaphragm is desirable as by discs 35 and 36, but the balancing of pressure on opposite sides of the diaphragm reduces the need even there. However, the discs can still be used and have a function in stiffening any type of thin or very flexible diaphragm.

The diaphragms thus balanced are counterbalanced by a spring 37 resting at one end upon the bracket 21 and at the other end against a collar 38 upon the rod 30. I find it desirable to make the height of this collar adjustable, as by a fastening 39 fitting through the hub 40 of the collar and into any of holes 41, in order that the sensitiveness of the mechanism as well as the relative quantities of fluids in the compartments 22 and 23 may be adjusted. This last adjustment affects the means of initially setting the parts of the gauge but, as the parts are enclosed within the tank can afford rough adjustment only.

I show the spring as surrounded by a shield 42 and a corresponding rim 43 upon the collar, though I recognize that these will not ordinarily be necessary and are beneficial chiefly in maintaining uniform counter-balance by keeping the spring in the position stated.

The use of the two compartments, even though one be connected with the atmosphere only, is very beneficial in freeing my mechanism from interference or inaccuracy by reason of variations in pressure or vacuum conditions within the tank and the direct weight-operated mechanism described is advantageous both broadly and specifically as shown, whether one compartment only be connected with the gauge or both compartments are so connected.

In Figure 6, I show a sight gauge 47, which is adapted for use with connection to but one compartment, but in the other gauges I contemplate connecting the gauge with both compartments. In either event the compartment 22 communicates by a passage 44 and pipe 45 with a gauge 46, shown in most of the figures as of U type.

Where both of the compartments are to be connected with the indicators I find it very desirable to form the connection from compartment 23 through one of the standards, as 18 which is made hollow for this purpose and which communicates at the bottom with a passage 48 and pipe 49. In this form, shown in Figure 2, the pipes 45 and 49 connect with the upper ends 50 and 51 of a tube 52 which holds a liquid 53 heavier than the fluid in the pipes and compartments and not readily vaporizable into or capable of mixing with this (gas or liquid) fluid. The best gas for the purpose is air and the liquid 53 could be in liquid which will comply with the requirements above and which will not freeze nor unduly vaporize into the air.

When the tank is empty the liquid 53 may be adjusted to lie at either equal or unequal heights in the two branches 54 and 55 of the U tube, but preferably at equal heights therein as shown at the zero point and at 56, but with any height 57 of gasoline in the tank, the fluid in the pipe 45 will depress the level of the liquid 53 in the side 55 and relatively raise the level in the side 54 to some point such as 58 from which a reading may be had upon the scale 59. At the same time that the expulsion from the space 22 has caused the gas or liquid in pipe 45 to push down the level of the indicating liquid in the U tube, the additional room provided in space 23 will relieve the pressure upon the top of the left hand column of liquid in branch 54, assisting in the movement of the liquid 53.

From a structural standpoint two details are shown in the U tube, which offer some advantage. The one is that the upper bend of one of the tubes, such as at 60, is replaced by a fitting having a filling opening closed by plug 60' by which the amount and distribution of the liquid or liquids and gas (if used) in the system may be adjusted and their distribution may be changed. A special tool should be used to seat this plug which preferably cannot be opened readily without such a tool.

At the bend 61 of the U tube the structure may be forwardly projected so as to pass through the dash at this point, placing the remainder of the tube back of the dash and moving the indicating tube and down connection 62 and these only to the face of the dash. A corresponding bend in the connection 60 would throw the down tube 62 also back of the dash. Under these circumstances the only part of the system which need be of glass, is the indicating tube 54.

In the form shown in Figure 4, the space 22 is connected with the left hand end of the tube. The sides 54', 55', of the U tube are sloped so as to give a much larger quantity of indicating liquid in the system or, if the indications be placed upon the slope, as at 59', a much greater range of movement for a given difference in pressure. The scale may, however, be placed upon the vertical portion of the tube as at $59^2$.

In this form and also, in the form shown in Figure 5, excessive movement of the indicating liquid within the tube is checked by constrictions in the tube, which are shown at 63. These permit gradual flow of the indicating liquid, but check excessive movement.

In the form shown in Figure 4, the lower range of the scale may be exaggerated in movement by being placed upon the slope of the tube as 59' while the upper part of the scale, indicating fuller tank readings, where accuracy is not of quite the same importance, may be placed in the vertical part of the tube at $59^2$.

In the form shown in Figure 6 a single sight tube 47 is connected with but one of the spaces, such as 22, by a pipe 45.

In the form shown in Figure 7, the pressure of the fluid within space 22 is applied against a diaphragm 64, which is held between flanges 65 by a preferably metal fitting 66 and the flange 67 of a preferably glass indicator body 68. They are held together by any suitable means not shown. Cement could be used for this purpose. A link 69 connects an ear 70 upon the diaphragm with an indicating arm 71, whose end is pivoted at 72 to a link 73 carried by a support 74 upon a fitting 75. The indicator body and fitting are joined by flanges 76 and 77. Movement of arm 71 across a scale 78 upon or within the indicator body shows the quantity of gasoline within the tank. The holes 79 permit free flow of fluid from the pipes without requiring that its end be left open.

With a diaphragm which would spring back to position by its own elasticity, the form shown in Figure 7 would operate with a single connection only to one of the spaces, 22 but with a more flexible diaphragm, I prefer to connect the opposite space 23 with the fitting 75 and to form the support 74 as a pipe or hollow tube so that the fluid for space 23 and its connections may fill the body of the gauge. As with diaphragms 24 and 25 it is desirable to use discs or other stiffening means, such as 35, with very light or flexible diaphragms to insure substantial bodily movement of the diaphragms and to afford suitable support and mount for the ear 70.

It will be obvious that all or a part of my invention may be presented in other forms, as appeals to the whim or need of those skilled in the art; and it is my purpose to include all such forms within my invention as come within its reasonable spirit and scope.

Having thus described my invention, what I claim as new and desire to secure by Letters Patent is:—

1. In an indicator for gasoline depth, a tank, a pair of upper and lower balanced diaphragms therein, one being in the bottom of the tank, walls about each providing a space adjacent thereto free from communication with the tank, support for the upper diaphragm, means for mechanically connecting the diaphragms causing them to move in unison, a counter-balance for the weight of the diaphragms and for the connecting means, a U tube indicator having an indicating liquid therein and fluid connections from one side of the U-tube to the space adjacent the upper diaphragm and from the other side of the U tube to the space adjacent the lower diaphragm.

2. In an indicator for gasoline depth, a tank, a pair of upper and lower balanced diaphragms therein, one being in the bottom of the tank, walls about each providing a closed space adjacent thereto free from communication with the tank, support for the upper diaphragm, means for mechanically connecting the diaphragms causing them to move in unison, a counter-balance for the weight of the diaphragms and for the connecting means, a fluid-operated sight indicator, liquid therein and fluid communication therefrom to each of the spaces.

THOMAS M. EYNON.